US005878608A

United States Patent [19]

Alyanakian

[11] Patent Number: 5,878,608

[45] Date of Patent: Mar. 9, 1999

[54] LOCKING SLIDE LATCH

[75] Inventor: Robert D. Alyanakian, West Chester, Pa.

[73] Assignee: Southco, Inc., Concordville, Pa.

[21] Appl. No.: 110,039

[22] Filed: Jul. 2, 1998

Related U.S. Application Data

[63] Continuation of Ser. No. 780,214, Jan. 8, 1997.

[51] Int. Cl.[6] .................... G05B 55/00

[52] U.S. Cl. .................... 70/208; 292/175; 292/153; 292/DIG. 38; 292/DIG. 31; 292/DIG. 63; 70/467

[58] Field of Search .................... 292/171, 175, 292/DIG. 31, DIG. 63, 145, 153, DIG. 38; 70/208, 210, 144, 145, 467, 484

[56] References Cited

U.S. PATENT DOCUMENTS

| | | | |
|---|---|---|---|
| 137,211 | 3/1873 | Jones . | |
| D. 208,088 | 7/1967 | Banner | D8/341 |
| D. 230,132 | 1/1974 | Pastva, Jr. | D8/338 |
| D. 324,636 | 3/1992 | Schlack et al. . | |
| 824,780 | 7/1906 | Ecker . | |
| 1,675,591 | 7/1928 | Bell | 292/175 |
| 2,922,297 | 1/1960 | Hitzelberger | 70/144 |
| 3,209,563 | 10/1965 | Pelcin | 70/208 |
| 3,389,932 | 6/1968 | Pastva, Jr. | 292/173 |
| 3,602,017 | 8/1971 | Bauer | 70/78 |
| 3,797,870 | 3/1974 | Beckman | 70/208 |
| 3,841,674 | 10/1974 | Bisbing et al. | 292/175 |
| 3,850,464 | 11/1974 | Bisbing et al. | 292/175 |
| 3,871,198 | 3/1975 | Miller | 70/208 |
| 4,470,624 | 9/1984 | Bisbing | 292/DIG. 38 |
| 4,641,506 | 2/1987 | Boucher | 292/153 |
| 4,650,230 | 3/1987 | Takasaki | 70/208 |
| 4,790,579 | 12/1988 | Maxwell et al. | 292/175 |
| 4,837,975 | 6/1989 | Simpson | 292/175 |
| 4,995,649 | 2/1991 | Magnusson | 292/175 |
| 5,062,671 | 11/1991 | Goetz et al. | 292/175 |
| 5,096,240 | 3/1992 | Schultz | 292/153 |
| 5,121,951 | 6/1992 | Harbum et al. | 292/175 |
| 5,121,952 | 6/1992 | Jason | 292/175 |
| 5,145,221 | 9/1992 | Pennebaker et al. | 292/175 |
| 5,193,707 | 3/1993 | Mizumura | 292/175 |
| 5,315,850 | 5/1994 | Edeus et al. | 292/153 |
| 5,358,291 | 10/1994 | Malmanger et al. | 292/175 |
| 5,482,333 | 1/1996 | Gehrs et al. | 292/DIG. 63 |
| 5,504,424 | 4/1996 | Smith | 292/169.21 |

FOREIGN PATENT DOCUMENTS

| | | | |
|---|---|---|---|
| 238670 | 12/1978 | France . | |
| 1184431 | 6/1968 | United Kingdom . | |
| 2231612 | 11/1990 | United Kingdom | 292/DIG. 38 |

OTHER PUBLICATIONS

DZUS Catalogue, p. 35, Series 404 Latch (1985).

Camloc Catalogue, p. F–95, PTL30 Series Latch.

Eberhard Catalogue No. 103 (1985) Section 1, p. 87, Slam Latch No. 4821.

Southco Latches and Access Hardware Handbook 43 (1993) pp. G–3, G–6, G–7, G–18 and G–19.

*Primary Examiner*—Darnell M. Boucher

*Attorney, Agent, or Firm*—Paul & Paul

[57] ABSTRACT

A locking slide latch comprises components that are easily assembled without the need for separate fasteners or adhesives. A preferred latch comprises a gripable base member having a spring member mounted thereon, a locking member rotatably mounted on the spring member and a rotatable lock plug mounted in the spring member and contacting the locking member. These components are assembled together without the use of separate fasteners or adhesives, thereby simplifying assembly and allowing for interchangeability of parts to meet varying latch requirements. The latches are preferably manufactured from corrosion resistant materials such as plastics, composites and corrosion resistant metals, and are highly suitable for use in automotive, recreational vehicle and marine applications.

11 Claims, 6 Drawing Sheets

LOCKING SLIDE LATCH

CROSS-REFERENCE TO RELATED APPLICATIONS

This a is division of pending U.S. patent application Ser. No. 08/780,214 filed Jan. 8, 1997.

BACKGROUND OF THE INVENTION

1. Field of the Invention

The present invention relates to slide latches for doors, panels and the like. The latches incorporate a locking feature and are resistant to corrosion, making them useful in automotive, recreational vehicle, marine and other applications.

2. Brief Description of the Prior Art

Various types of slide latches are known. These latches are inserted in a cut-out opening of one panel and are slidable in the plane of the panel to engage a second panel or frame member. Conventional slide latches are typically non-locking and can be relatively complex to assemble and susceptible to corrosion.

U.S. Pat. Nos. 3,841,674 and 3,850,464 to Bisbing, et al., which are hereby incorporated by reference, disclose slide latches of one-piece or two-piece construction that do not include a locking feature.

The present invention has been developed in view of the foregoing, and to overcome the deficiencies of the prior art.

SUMMARY OF THE INVENTION

An object of the present invention is to provide a novel locking slide latch.

Another object of the present invention is to provide a slide latch comprising a gripable base member, spring means mounted on the base member and locking means rotatably mounted on the base member.

A further object of the present invention is to provide a slide latch comprising a gripable base member, a spring member mounted on the base member, a locking member rotatably mounted on the spring member and a lock plug in contact with the lock member.

Another object of the present invention is to provide a locking slide latch that comprises components that can be assembled together without the use of conventional fasteners such as screws and adhesives.

A further object of the present invention is to provide a locking slide latch that is resistant to corrosion.

Another object of the present invention is to provide a method of assembling a slide latch comprising the steps of mounting a spring member on a base member without the use of separate fasteners or adhesives, mounting a rotatable locking member on the spring member and mounting lock plug at least partially within the spring member and in contact with the locking member.

These and other objects of the present invention will become more readily apparent from the following description.

DETAILED DESCRIPTION OF THE PREFERRED EMBODIMENT

Figure 1:
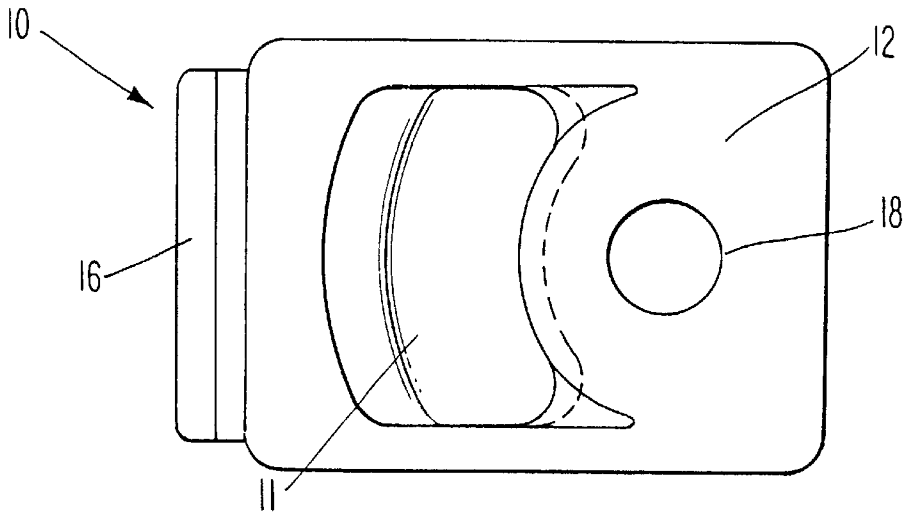
FIG. 1 is a top view of the body portion of a latch of the present invention.
Figure 2:
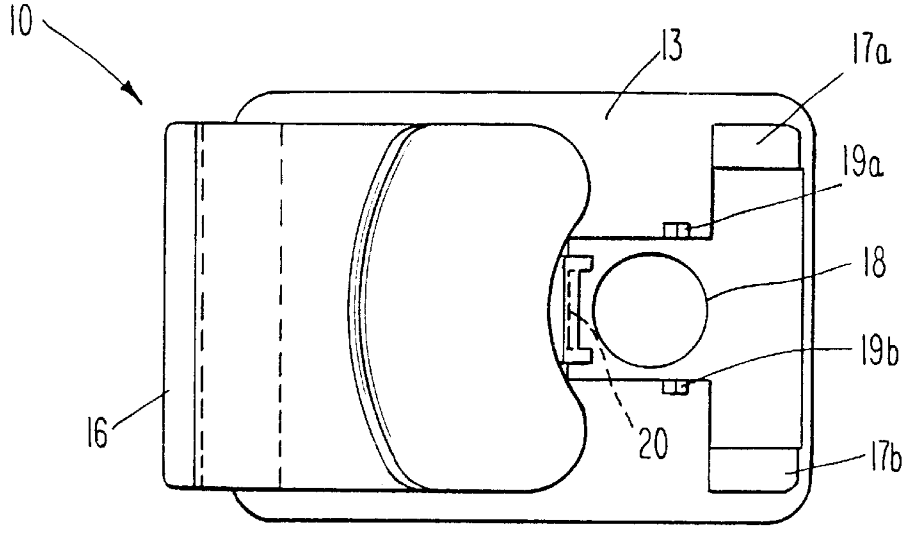
FIG. 2 is a bottom view of the body portion of a latch of the present invention.
Figure 3:
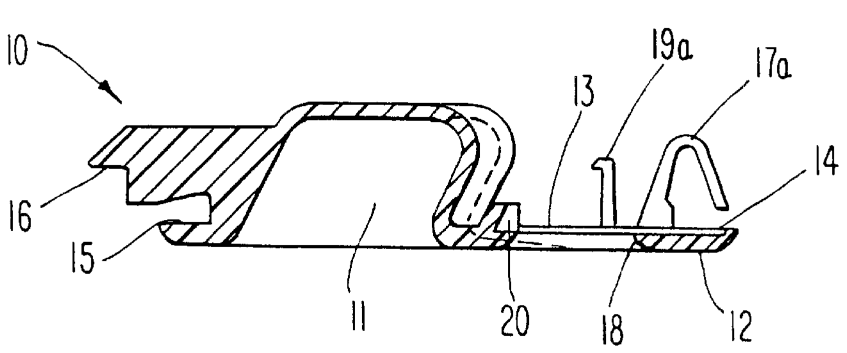
FIG. 3 is a sectional side view of the body portion of a latch of the present invention.

The locking slide latch of the present invention comprises a body portion that serves as a handle, a spring member that serves to bias the body portion in a closed position when the latch is installed, and a locking member that is rotatable into a position that prevents opening of the latch. Referring to the drawings in detail, in which like reference numbers represent like elements throughout the several drawings, FIGS. 1–3 show the gripable base member 10 of a preferred latch of the present invention. The base member 10 includes a handle opening 11 that is adapted to be gripped by an operator for opening the latch. The base member 10 includes a front surface 12 and a back surface 13 that is adapted to slide against the panel in which the base member is installed. The base member 10 includes an engaging portion 16 adapted to engage a second panel or frame member (not shown) when the latch is in the closed position. The term "frame member" as used herein is defined broadly to include any structure, such as a frame or panel, that is capable of being fastened to the panel in which the slide latch of the present invention is installed. As shown most clearly in FIG. 3, the base member includes end portions 14 and 15 that contact the panel in which the latch is installed (not shown). A pair of compliant clips 17*a* and 17*b* are located at one end of the base member and are adapted to secure the base member within the cut-out portion of the panel after the base member is snapped into place in the panel. The base member 10 includes a through-hole 18 extending from the front surface 12 to the back surface 13 that is adapted to receive a rotating lock plug, as more fully described below. On the back 13 of the base member, surrounding the through-hole 18, are prongs 19*a* and 19*b* and angled recess 20 that serve to secure the spring member when the latch is assembled, as discussed below.

The base member 10 may be manufactured from any suitable material such as plastic or metal. ABS plastic is a particularly preferred material for the base member due to its durability, ease of fabrication, low cost and resistance to corrosion. Although the base member 10 is shown as a solid piece of material in the section view of FIG. 3, it is preferred to provide hollow portions in the base member in order to save weight and material costs.

Figure 4:
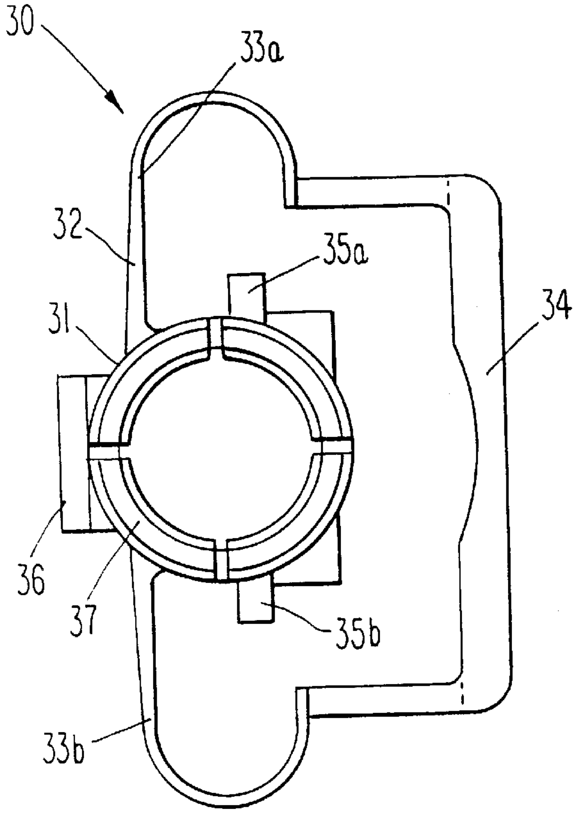
FIG. 4 is a top view of a spring member of the present invention.
Figure 5:
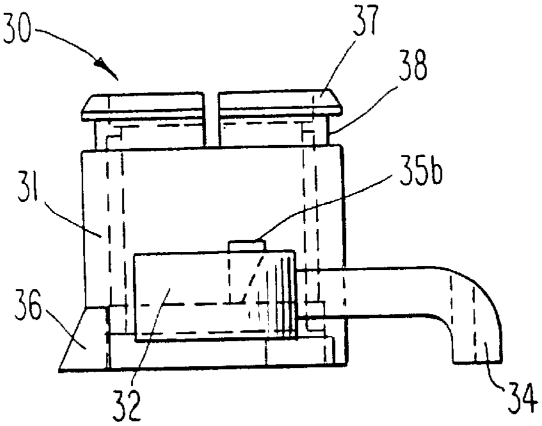
FIG. 5 is a side view of a spring member of the present invention.

FIGS. 4 and 5 illustrate a preferred spring member 30 of the present invention. The spring member 30 comprises a generally cylindrical body portion 31 with a complaint spring portion 32 extending therefrom. In the embodiment shown in FIGS. 4 and 5, the compliant spring portion 32 includes flexible sections 33*a* and 33*b* that provide flexure for the spring 32 and serve to bias the base member of the latch in the closed position when the latch is installed. A relatively rigid portion 34 extends from the flexible sections 33*a* and 33*b* of the spring and is adapted to contact the cut-out portion of the panel in which the latch is installed. The spring 32 is shown in the relaxed position in FIGS. 4 and 5. When force is applied from right to left on rigid member 34, flexure occurs in the flexible sections 33*a* and 33*b,* allowing rigid member 34 to move toward the cylindrical body 31 of the spring member. Shoulder 35*a* and 35*b* and angled retention member 36 are located around the periphery of the cylindrical body 31. When assembled, the shoulder members 35*a* and 35*b* engage the prongs 19*a* an 19*b* of the base member 10, and the angled retention member 36 engages the angled recess 20 of the base member 10. This engagement allows the spring member 30 to be snap-fit onto the base member 10 without the use of tools or conventional fastening means such as screws or adhesives.

In the preferred embodiment, the top of the cylindrical body portion 31 is divided into four quadrants 37 located at 90° intervals around the circumference of the cylinder. These divisions allow the quadrants to flex radially inward, thereby allowing a locking member to be snap-fit over the top of the cylinder 37. As shown most clearly in FIG. 5, a groove 38 of smaller radius is located below the top of the cylinder 37. When assembled, the locking member of the latch is retained within the groove 38 and rotates therein.

The spring member 30 can be manufactured from any suitable material such as plastic or metal. It is preferred to use corrosion resistant materials in the manufacture of the spring member. Acetels are preferred plastic for the spring member, with DELRIN™ being particularly preferred due to their excellent elasticity and resistance to corrosion, fracture and fatigue. It is also preferred to use a plastic that exhibits only minor changes in mechanical properties over varying temperature ranges. For example, if a latch of the present invention is to be subjected to a range of temperatures, it is desirable to use a plastic for the spring member that possesses relatively constant elasticity over the temperature range. As shown in FIGS. 4 and 5, the spring member 30 is preferably made from a single piece of material. However, various modifications can be made to the spring member, including the use of separate springs that are fastened to the cylindrical member 31. Such separate springs may be made of any suitable material such as plastic or stainless steel.

Figure 6:
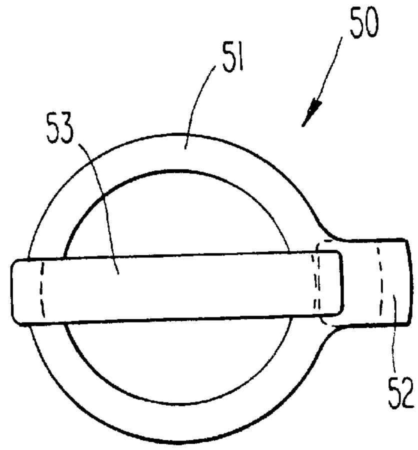
FIG. 6 is a top view of a locking member of the present invention.
Figure 7:
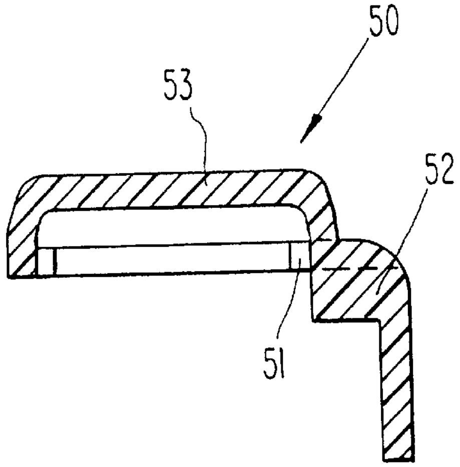
FIG. 7 is a side sectional view of a locking member of the present invention.

FIGS. 6 and 7 illustrate a preferred locking member 50 of the present invention. The locking member 50 includes a ring 51 that is adapted to be press-fit over the top 37 of the spring member 30 and to rotate in the groove 38. Extending radially outward and down from the ring member 51 is a locking finger 52 that is adapted to extend between the rigid member 34 and cylindrical base 31 of the spring member 30 when the locking member 50 is mounted on the spring member 30. When assembled, the locking finger 52 may be rotated into a position against the rigid portion 34 of the spring member 30, thereby preventing movement of the rigid portion 34 toward the cylindrical body portion 31. The locking member 50 also includes a bar member 53 that extends across the diameter of the ring 51. The bar member 53 is adapted to contact a rotating lock plug or other actuating mechanism, as more fully described below.

The locking member 50 may be manufactured from any suitable material that possesses sufficient strength, such as metal, plastic or composite material. A particularly preferred material for the locking member 50 is glass filled nylon due to its excellent strength and corrosion resistance. Although the presently preferred configuration of the locking member 50 is shown in FIGS. 6 and 7, it should be recognized that the locking member may be provided in many different forms that allow locking of the latch when the locking member is rotated from an open to a closed position.

The preferred slide latch of the present invention also includes a lock plug that extends through the through-hole 18 of the base member 10 and contacts the locking member 50 in order to produce rotation thereof. This feature is shown most clearly in FIGS. 8F and 9. The lock plug 60 may be operated by a key. When the security of the key lock is not required, the lock plug 60 may be provided in the form of a generally cylindrical member that is freely rotatable by hand or by a tool actuator such as a hex wrench or screwdriver. The lock plug 60 includes protrusions 61*a* and 61*b* that are adapted to contact either side of the bar 53 of the locking member 50 when the latch is assembled. Rotation of the lock plug 60 causes rotation of the locking member 50 through contact between the protrusions 61*a* and 61*b* and the bar member 53. In the preferred key-operated lock plug, as shone in FIG. 8F, tumblers 62 are provided along one side of the plug. In addition, an E-ring 63 is provided on the lock plug 60 that is retractable in the radial direction in order to allow insertion of the lock plug 60 into the hollow cylindrical body portion 31 of the spring member 30. Once seated within the cylindrical body 31, the E-ring springs radially outward to secure the lock plug within the cylinder.

The components of the lock plug 60 are preferably manufactured from materials such as plastic and noncorrosive metal. In the presently preferred embodiment, the body of the lock plug 60 is manufactured from plastic, while the tumblers 62 and E-ring 63 are manufactured from brass. Such a lock plug is highly resistant to corrosion.

Figure 8A:
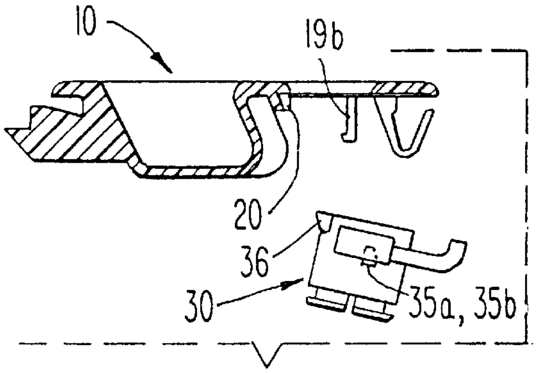
FIGS. 8A–F represent an assembly diagram of a latch of the present invention.
Figure 8B:
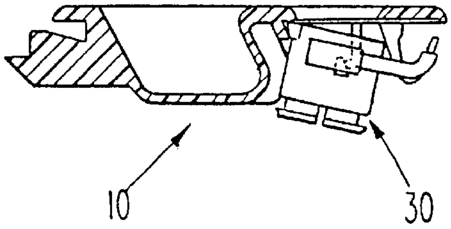
Figure 8C:
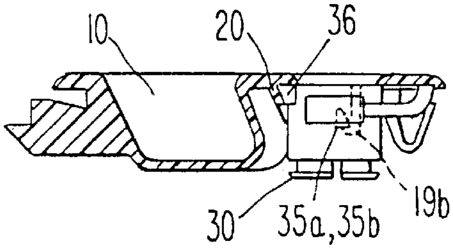
Figure 8D:
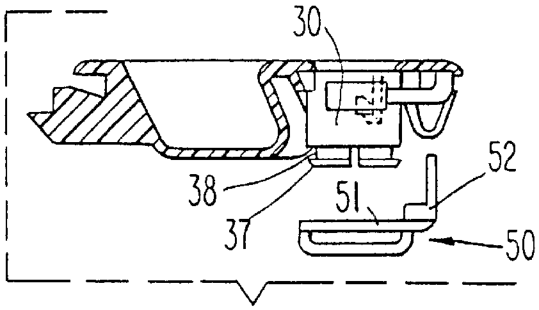
Figure 8E:
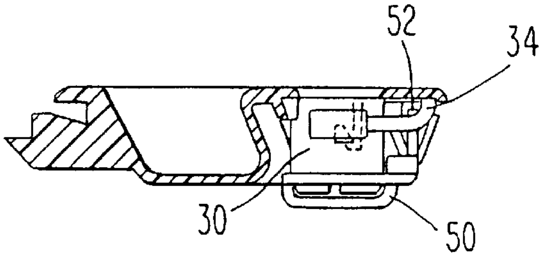
Figure 8F:
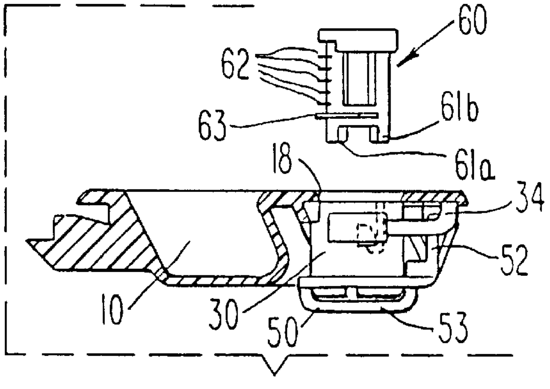

The method of assembling the preferred slide latch of the present invention is shown in FIGS. 8A–G. In FIG. 8A, the spring member 30 is oriented in relation to the base member 10 as shown. The angled recess 20 and prongs 19*a* and 19*b* are adapted to receive the angled retention member 36 and shoulders 35*a* and 35*b,* respectively. As shown in FIG. 8B, the angled retention member 36 is first inserted in the angled recess 20. In FIG. 8C, the prongs 19*a* and 19*b,* are snapped over the shoulders 35*a* and 35*b* in order to mount the spring member 30 to the base member 10. Such a snap-fit feature allows for ease of assembly without the need for tools or fasteners such as screws or adhesives. As an alternative, the spring member 30 may be fastened to the base member 10 by means of ultrasonic welding. In FIG. 8D, the locking member 50 is oriented as shown for subsequent mounting on the spring member 30. The ring 51 of the locking member 50 is snap-fit over the end 37 of the spring member 30 and is seated within the recessed groove 38. As shown in FIG. 8E, when the locking member 50 is mounted, the locking finger 52 may be disposed against the rigid member 34, thereby preventing movement of the rigid member 34 toward the cylindrical base 31 of the spring member 30. If the locking finger 52 is rotated away from contact with the rigid member 34, the rigid member is allowed to move toward the cylindrical base 31 of the spring member 30 against the force of the compliant portion 32 of the spring. In FIG. 8F, the lock plug 60 is oriented as shown with respect to the base member 10 and is then inserted through throughhole 18 and into the interior of the cylindrical body 31 of the spring member 30.

Figure 9:
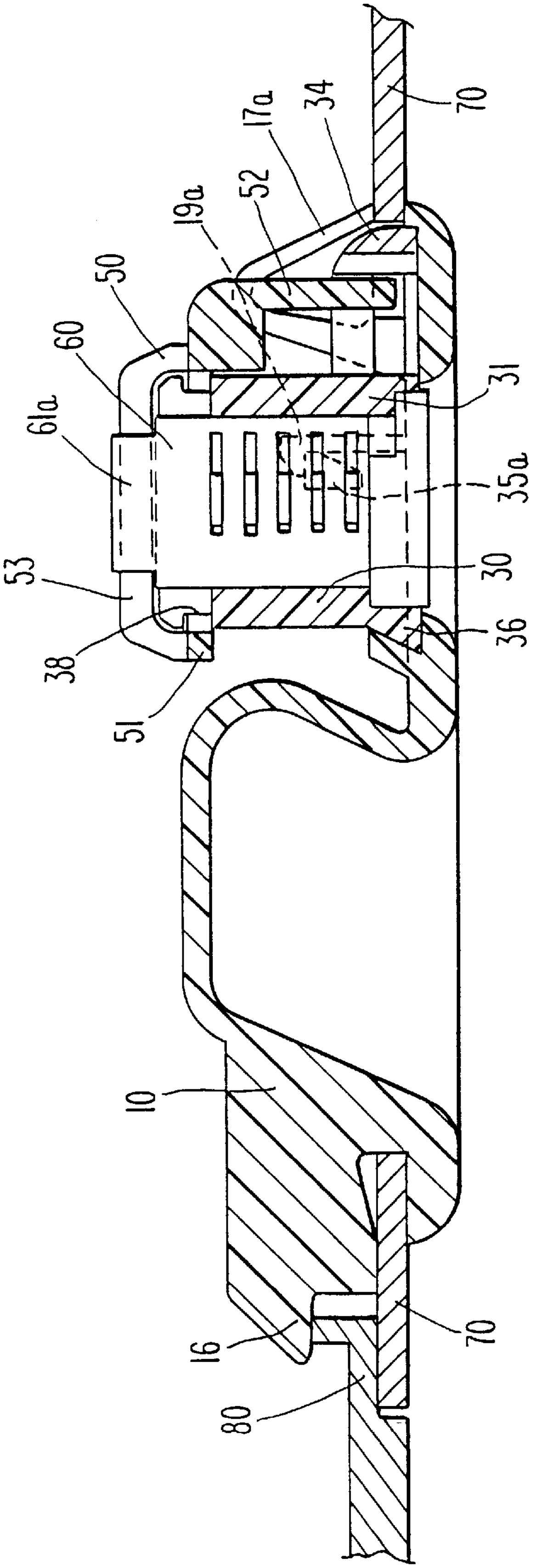
FIG. 9 is a sectional side view of an assembled latch of the present invention.

Once fully inserted, as shown in FIG. 9, the protrusions 61*a* and 61*b* of the lock plug 60 contact the sides of the bar member 53 of the locking member 50. Due to the contact between the protrusions 61*a* and 61*b* and the bar member 53, rotation of the lock plug causes rotation of the locking member 50. When the locking member 50 is in the orientation shown in FIG. 9 in which the locking finger 52 is against the rigid member 34, the latch is in the locked position. When the locking finger 52 is rotated a sufficient amount in either direction, e.g. 90° , there is no contact between the locking finger 52 and rigid member 34, thereby allowing the rigid member 34 to move toward the cylindrical base 31 of the spring member 30 when a sufficient force is applied thereto.

Once assembled in the manner shown in FIGS. 8A–F, the locking slide latch of the present invention may be installed in a cut-out portion of a panel in a manner similar to conventional, non-locking slide latches. The installation of such conventional latches is described in U.S. Pat. Nos. 3,841,674 and 3,850,464, cited previously. A fully assembled and installed slide latch is shown in FIG. 9. The base member 10 is located in a cut-out portion of a panel 70. In the latched position shown in FIG. 9, the engaging portion 16 of the base member 10 engages a frame member 80 to thereby releasably retain the panel 70 relative to the frame member 80.

As can be seen from the assembly drawings of FIGS. 8A–F, the slide latch of the present invention may be assembled simply without the use of tools. In addition, fastening means such as screws, rivets and adhesives used in conventional slide latches are not required during the assembly process. The use of the separate components for the base member 10, spring member 30, locking member 50 and lock plug 60 allows for many variations in the final latch, depending on the components selected. For example, the base member 10 may be provided in various dimensions to accommodate varying panel thicknesses. In this manner, the present latch may be altered to fit panels with thicknesses of less than 1 to greater than 10 mm. It is particularly preferred to provide the present slide latches in sizes that fit panels with thickness of from about 1.6 to about 6.5 mm. In addition, the end portion 16 of the member 10 may be altered to accommodate varying frame member sizes. Furthermore, the components of the present slide latches may be adjusted to provide variable grip ranges. Therefore, the slide latches of the present invention are adaptable to many varying applications and can be assembled to meet varying design criteria. Another advantage of the present slide latches is that they can be assembled without separate fasteners or adhesives and can easily be installed in a panel.

The locking mechanism provided on the slide latches of the present invention provides several advantages over conventional slide latches. Typically, slide latches are not provided with a locking feature. When it is desired to lock a conventional slide latch, a separate locking mechanism is usually provided on the panel adjacent to the latch. The slide latches of the present invention incorporate a locking mechanism directly therein, thereby providing simplified installation.

A major advantage of the preferred slide latches of the present invention is their resistance to corrosion. The latches are preferably manufactured from corrosion resistant materials such as plastics, thereby allowing for use in automotive, recreational vehicle and marine applications, where exposure to moisture and other corrosive elements is frequently encountered.

In FIGS. 10 to 14 is shown a locking slide latch in accordance with another preferred embodiment of the present invention. For the sake of clarity, the portions of the locking slide latch in accordance with the present embodiment which correspond to the portions described in relation to the locking slide latch earlier described and shown in FIGS. 1–9 will be described using the same number designations. The locking slide latch 100 similar to the locking slide latch earlier described also comprises, as portions thereof, a body portion, a spring member and a locking member. As will be described in more detail hereinafter, the primary differences in the locking slide latch 100 from that earlier described are the engaging portion 116, spring 130 and locking member 150.

Figure 13:
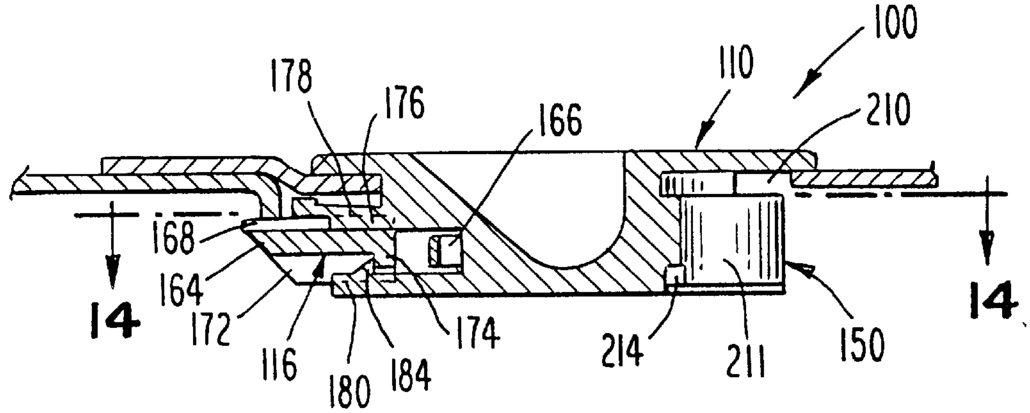
FIG. 13 is a right side elevational view of the latch of FIG. 10, taken along a line 12—12 of FIG. 11.
Figure 14:
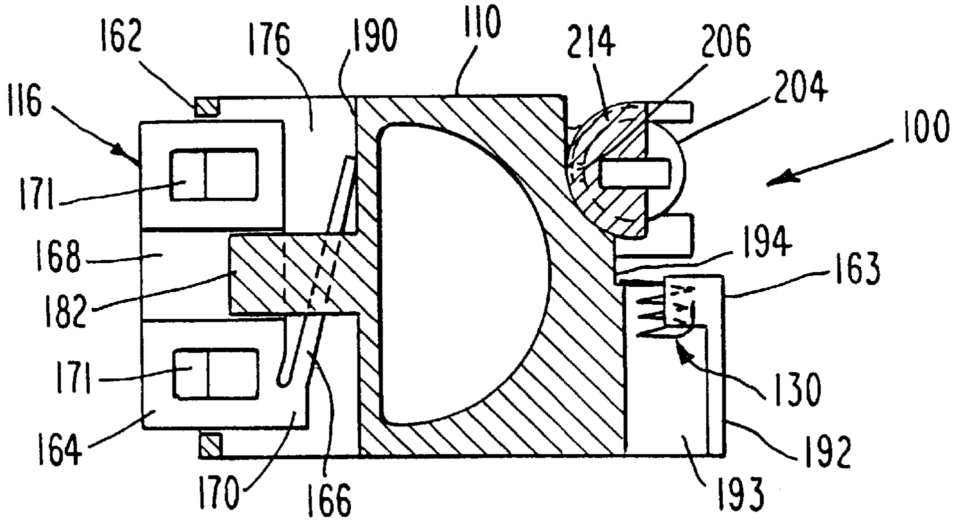
FIG. 14 is a top plan view of the latch of FIG. 10 taken along the line 14—14 of FIG. 13.

The base member 110 in this embodiment as shown in FIG. 14 includes a separate, independently operating engaging portion or pawl 116. The base member 110 includes a cavity 176 provided within a forward surface 162 into which the engaging portion 116 is received. The engaging portion 116 in this embodiment comprises a body 164 generally rectangular in configuration and biasing means attached with the body 164, which in this embodiment comprises a leg 166. The leg 166 in accordance with the present embodiment is generally elongated and attached at one end to the body 164, and with its terminating end being at spaced separation from the body 164. The leg 166 is sufficiently flexible in operation as will be described in further detail below. The body 164 of the engaging portion 116 includes a slot 168, generally rectangular in this embodiment, provided within its upper surface. In addition, a boss 170, generally square in configuration, is attached to a front surface of the body 164 to which the leg 166 is attached. Further, provided within the upper surface of the body 164 is two cavities 171, generally rectangular in shape, and positioned proximate terminating ends. Also, as best seen in FIG. 13, provided within the lower surface of the body 164, and opposing the slot 168 is a slot 172. The difference in this slot 172 from the slot 168 is that the slot 170 does not extend the entire width of the body 164, but rather terminates by an end wall 174 which is proximate the front surface of the body 164, for the purpose described below. The engaging portion 116 may be manufactured from any suitable material; one example is plastic such as polycarbonate.

The base member 110 as shown in FIGS. 13 and 14 includes the cavity 176, generally rectangular in configuration, into which the engaging portion 116 is received. The cavity 176 is defined by an upper surface 178 and a lower surface 180. In this embodiment, an upper boss 182 is attached to the upper surface 178 and a lower boss 184 is attached to the lower surface 180. The upper boss 182 in this embodiment is generally rectangular in shape and positioned so as to be received into the slot 168 provided within the upper surface of the engaging portion 116. The lower boss 184 in this embodiment includes a generally ramped camming wall and a locking wall substantially perpendicular to the lower surface 180 which operates to retain the engaging portion 116. Specifically, upon assembly the engaging portion 116 is positioned so that the leg 166 is first received within the cavity 176 in the base member 110. The slot 168 is received onto the upper boss 182, and the end wall 174 first engages the camming surface of the lower boss 184, and when mounted the end wall 174 is adapted to engage the locking surface of the lower boss 184 to prevent the engaging portion 116 from separating from its position within the base member 110. In the assembled position, the leg 166 of the engaging portion 116 engages a rear surface 190 defined by the cavity 176. Specifically, as the engaging portion 116 in operation engages a second panel or frame member, the engaging portion 116 will be moved from an extended position in an inward direction toward the base member 110 to a retracted position due to the flexing action of the leg 166. Similarly, the resiliency of the leg 166 operates to return the engaging portion 116 toward its original position and to the extended position when not engaging the second panel or frame member, such as when the lock is in an open position.

Figure 10:
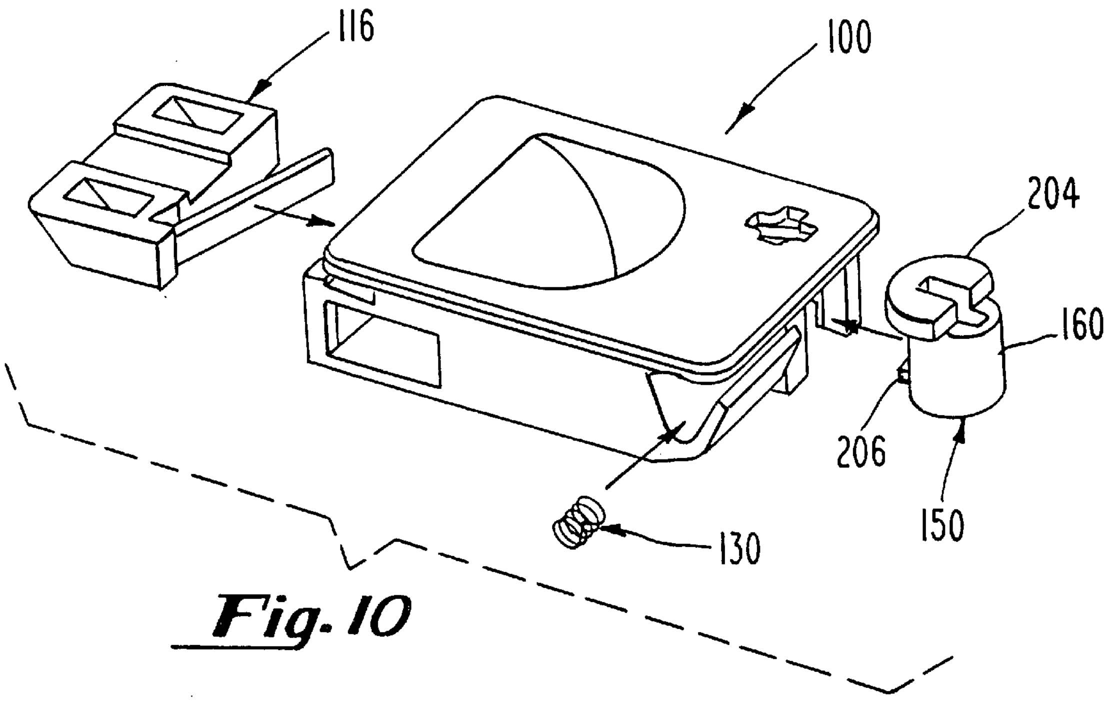
FIG. 10 is an exploded perspective view of a latch in accordance with another embodiment of the present invention.
Figure 11:
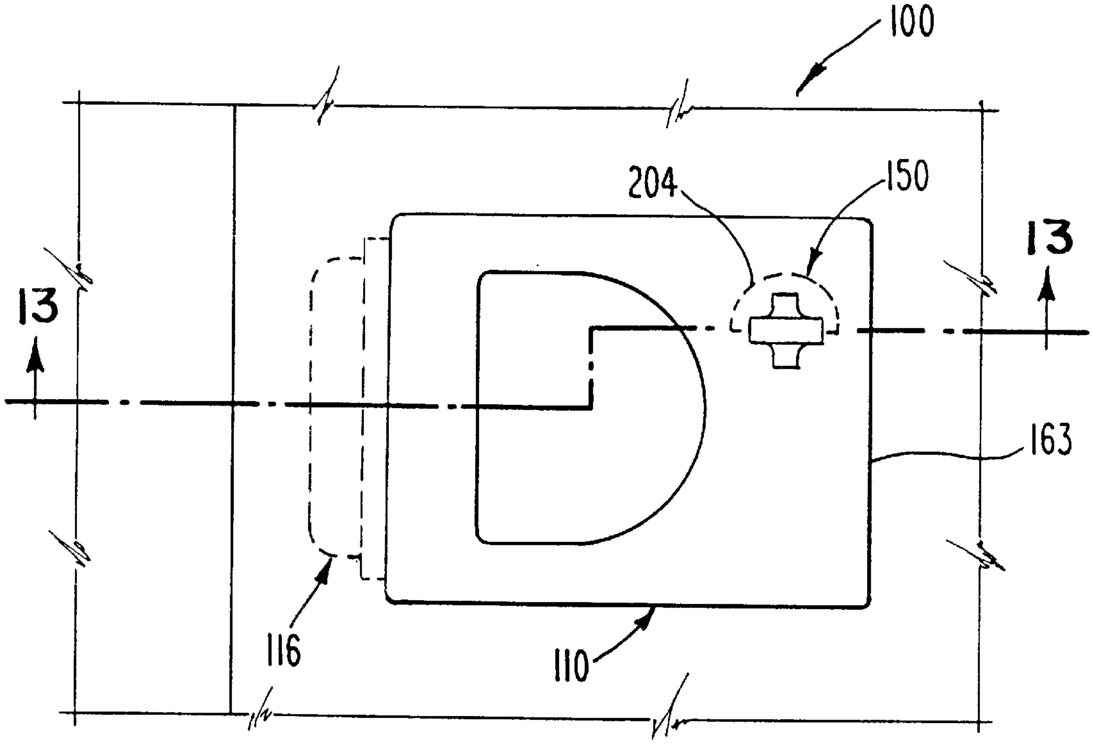
FIG. 11 is a top plan view of the latch of FIG. 10, shown in a mounted position.
Figure 12:
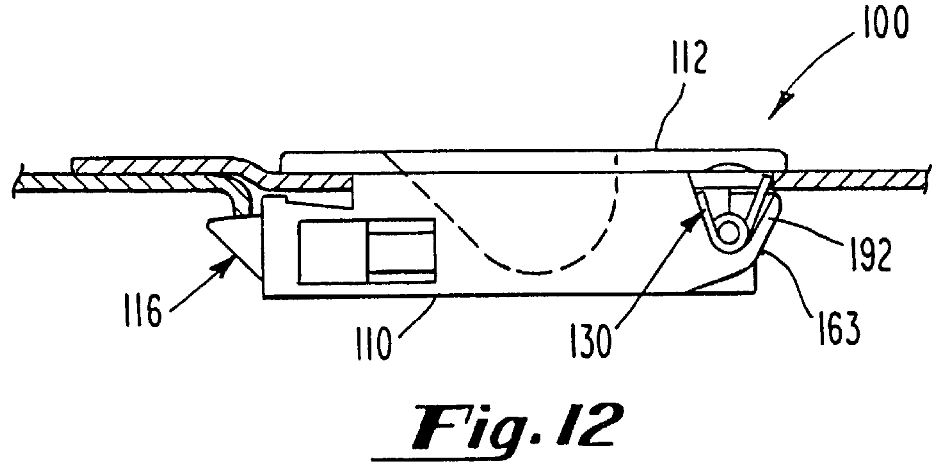
FIG. 12 is a left side view of the latch of FIG. 10.

The spring member 130 in this embodiment as best seen in FIGS. 10, 12 and 14 comprises a torsion spring, preferably of metal, and received within the base member 110 proximate its rear surface 163. Specifically, the body member 110 in this embodiment includes a lip 192, which extends approximately half the length of its rear surface 163, and which defines a channel 193, generally V-shaped, into which the spring member 130 is received. In this embodiment, one leg of the torsion spring is positioned within the gap between the lip 192 and surface 112 of the base member 110 and the second leg of the torsion spring is received within a groove 194 provided within the base member 110 proximate the channel 193.

The locking member 150 in this embodiment as best seen in FIGS. 10, 13 and 14 comprises a boss 204 connected with the lock plug 160. In the present embodiment, the boss 204 is generally semi-circular in shape and attached at one end to the lock plug 160. In addition, a retaining boss 206 is attached to the locked plug 160 at the end opposite the boss 204, the purpose of which will be described hereafter.

The body member 110 is adapted to receive the lock plug 160 for rotation of the locking member 150 corresponding with rotation of the lock plug 160. In this embodiment, the base member 110 is provided with an upper cavity 210 into which the boss 204 is received, a central cavity 211 into which the cylindrical body of the lock plug 160 is received, and a channel 214, which in this embodiment is approximately 45° in length into which the retaining boss 206 is received. Specifically, the end walls of the channel 214 operate to limit the rotation of the lock plug 160 due to its engagement with the retaining boss 206. In operation of the present embodiment, when in a locked position, the lock plug 160 is moved so that the boss 204 of the locking member 150 is positioned with part of its radiused portion positioned proximate the rear surface 163 of the base member 110, and in this position is adapted to abut the panel surface formed by the cut-out portion when the base member 110 is slide relative to the panel, such as shown in dotted lines in FIG. 11. In an open position, the lock plug 160 is in a position so that the planar portion of the boss 204 of the locking member 150 is positioned adjacent the rear surface 163 of the base member 110, so that the base member 110 can be slid relative to the panel in which the latch is mounted, such as shown in FIG. 10. In this embodiment, the length of the channel 214 is such that when the locking member 150 is in its open position, the detent boss 206 is positioned against one end wall of the channel 214, and when the locking member 150 is in its closed position the detent boss 206 is positioned against the opposite end wall of the channel 214. The combination locking member and lock plug in this embodiment can be manufactured from any suitable material, one example is plastic such as ABS.

The remaining structure and operation of the lockable slide latch 100 is the same as that described earlier in the application and shown in FIGS. 1–9, and for the sake of brevity will not be further described herein.

While the present invention is described in terms of the preferred embodiment, many modifications and variations are possible. Fore example, various spring configurations may be used in place of the disclosed spring member. Furthermore, the function of the spring member and the rotating locking member may be combined through the use of a unitary rotating member that, in one orientation, acts as a spring to bias the latch in the closed position and, in another orientation, acts as a locking member to prevent movement of the latch.

Accordingly, it is understood that the above description of the present invention is susceptible to considerable modifications, changes and adaptations by those skilled in the art, and that such modifications, changes and adaptations are intended to be considered within the scope of the present invention, which is set forth by the appended claims.

We claim:

1. A slide latch comprising:

a) a base member having means for installation in a panel and for sliding relative to said panel to releasably retain said panel relative to a frame member;

b) spring means mounted on said base member for biasing said base member toward engagement with said frame member; and c) locking means rotatably mounted on said base member and adapted to rotate into at least one position that substantially prevents said base member from sliding relative to said panel to thereby maintain the latch in a fastened position, wherein said locking means in the at least one position is rotated to contact said spring means to substantially prevent said base member from sliding relative to said panel.

2. The slide latch according to claim 1, wherein said spring means is snap-fit on said base member.

3. The slide latch according to claim 1, wherein said locking means is adapted to rotate into a second position in which said locking means does not contact said spring means to allow said base member to slide relative to said panel.

4. A slide latch comprising:

a) a gripable base member adapted for installation in a panel and for sliding relative to said panel to releasably retain said panel relative to a frame member;

b) a spring member mounted on said base member having a generally cylindrical body portion and a spring portion extending therefrom;

c) a locking member rotatably mounted on said spring member and adapted to rotate into a position that substantially prevents said base member from sliding relative to said panel; and d) a lock plug disposed at least partially within said cylindrical body portion of said spring member and contacting said locking member, wherein rotation of said lock plug causes rotation of said locking member.

5. The slide latch according to claim 4, wherein said base member and said spring member comprise means for mounting said spring member to said base member without the use of separate fasteners or adhesives.

6. The slide latch according to claim 4, wherein said spring portion of said spring member comprises at least one flexible section and at least one rigid section that is adapted to contact the panel in which said base member is installed.

7. The slide latch according to claim 6, wherein said locking member comprises a locking finger extending radially outward therefrom that is adapted to rotate into a position between said rigid section of said spring portion and said cylindrical body portion to thereby substantially prevent movement of said rigid section towards said cylindrical body portion.

8. The slide latch according to claim 4, wherein said locking member is snap-fit on said cylindrical body portion of said spring member.

9. The slide latch according to claim 4, wherein said Lock plug requires a key for rotation.

10. The slide latch according to claim 4, wherein said base member, spring member, locking member and lock plug are made of corrosion resistant materials.

11. The slide latch according to claim 4, wherein said base member, spring member, locking member and lock plug are assembled together without the use of separate fasteners or adhesives.

* * * * *

UNITED STATES PATENT AND TRADEMARK OFFICE

CERTIFICATE OF CORRECTION

PATENT NO. : 5,878,608

DATED : March 9, 1999

INVENTOR(S) : Robert D. Alyanakian

It is certified that error appears in the above-identified patent and that said Letters Patent is hereby corrected as shown below:

Title Page, item [63] "Continuation" should be deleted and replaced with --Division--.

Signed and Sealed this

Twenty-fourth Day of August, 1999

*Attest:*

Q. TODD DICKINSON

*Attesting Officer*

*Acting Commissioner of Patents and Trademarks*